US00RE40269E

(19) United States
(12) Reissued Patent
Mochizuki et al.

(10) Patent Number: US RE40,269 E
(45) Date of Reissued Patent: Apr. 29, 2008

(54) RECORDING DEVICE

(75) Inventors: Tatsuo Mochizuki, Higashiyatsushiro-gun (JP); Eiji Nakazawa, Nirasaki (JP); Tsuyoshi Kubota, Nakakoma-gun (JP)

(73) Assignee: Nisca Corporation, Yamanashi-ken (JP)

(21) Appl. No.: 10/463,770

(22) Filed: Jun. 18, 2003

Related U.S. Patent Documents

Reissue of:
(64) Patent No.: 6,249,303
Issued: Jun. 19, 2001
Appl. No.: 09/460,657
Filed: Dec. 13, 1999

(30) Foreign Application Priority Data

Aug. 31, 1999 (JP) ..... 11-244408

(51) Int. Cl.
*B41J 2/32* (2006.01)

(52) U.S. Cl. ..... 347/222; 347/171; 347/218
(58) Field of Classification Search ..... 347/171, 347/174, 176, 222
See application file for complete search history.

(56) References Cited

U.S. PATENT DOCUMENTS 5,332,889 A 7/1994 Lundstrom et al. ..... 235/380
5,381,209 A 1/1995 Binder et al. ..... 271/302 X
5,600,362 A * 2/1997 Morgavi et al. ..... 347/218
5,709,484 A * 1/1998 Dorner ..... 400/188
5,768,143 A * 6/1998 Fujimoto ..... 700/235
5,771,058 A * 6/1998 Kobayashi ..... 347/218
5,806,999 A * 9/1998 Kobayashi ..... 400/188
5,825,392 A * 10/1998 Mochizuki ..... 347/197
5,941,522 A 8/1999 Hagstrom et al. ..... 271/225
5,959,278 A * 9/1999 Kobayashi et al. ..... 235/449
5,966,160 A * 10/1999 Nardone et al. ..... 347/218
6,094,209 A * 7/2000 Nardone et al. ..... 347/171
6,095,220 A * 8/2000 Kobayashi et al. ..... 156/540
6,285,387 B1 * 9/2001 Ueno et al. ..... 347/222

FOREIGN PATENT DOCUMENTS

JP 09-131944 * 5/1997

* cited by examiner

*Primary Examiner*—Huan Tran
(74) *Attorney, Agent, or Firm*—Westerman, Hattori, Daniels & Adrian, LLP.

(57) ABSTRACT

A recording device having a first card transfer passage with a card supply unit and a second card transfer passage intersecting the first card transfer passage enables the component elements including an information recording means such as a thermal-transfer printer to be assembled compact and efficiently handle one or more cards at one time. Such rational arrangement of the first and second card transfer passages includes a card turning means located at the intersection of the passages for transferring the card between the first and second card transfer passages and recording or printing information on either or both surfaces of the card. By adding a third card transfer passage extending radially from the intersection of the first and second card transfer passages, desired information can be recorded on the card in different manner.

51 Claims, 9 Drawing Sheets

3A
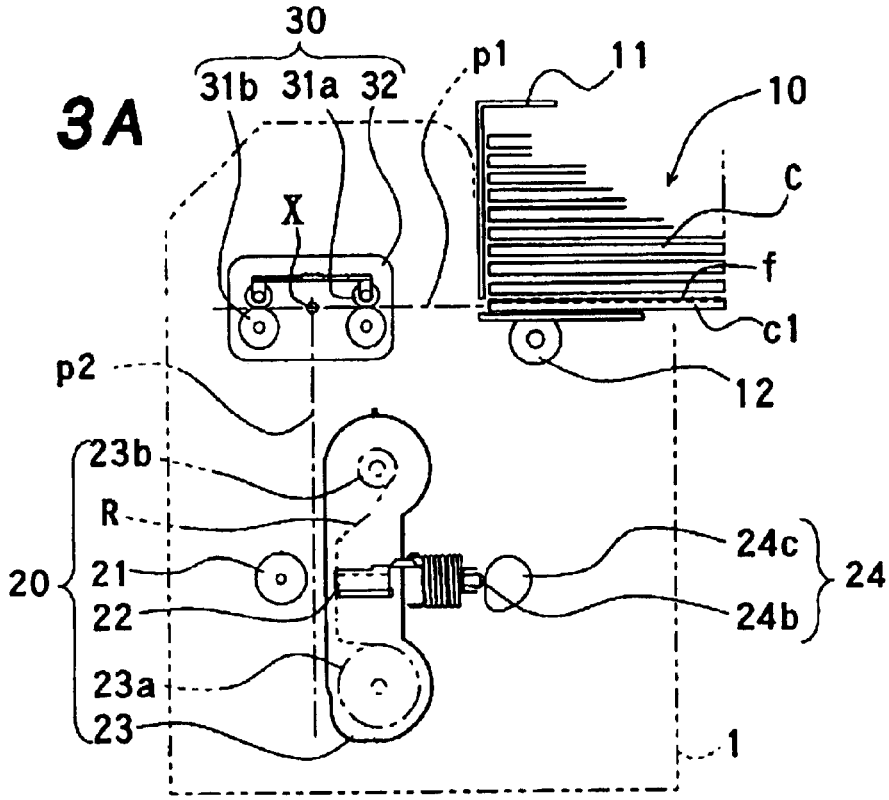
FIG. 3B
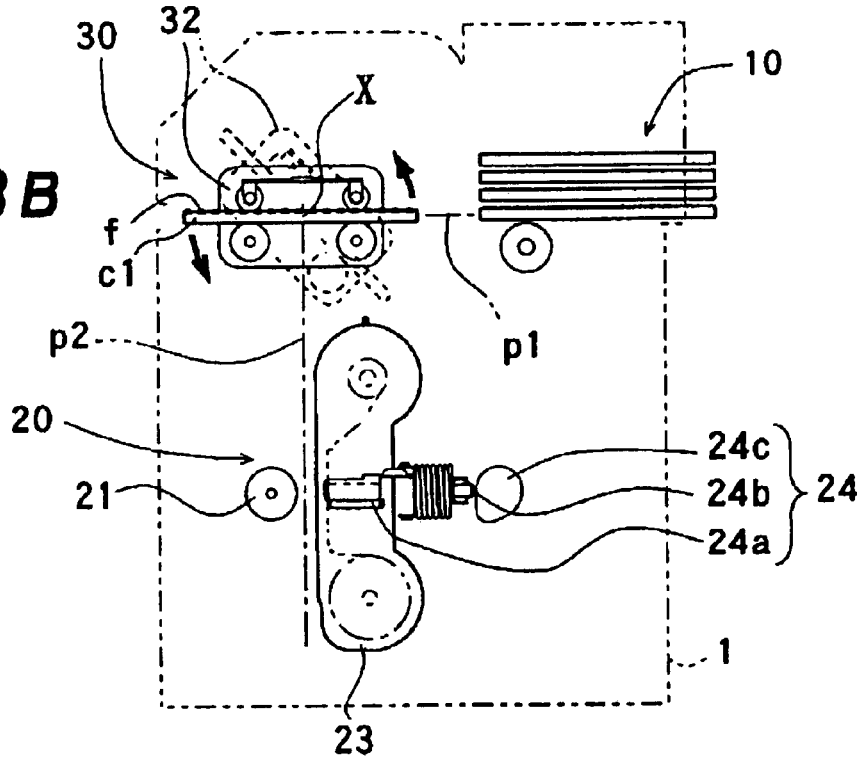

RECORDING DEVICE

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to a recording device for recording or printing various information such as images and letters on a recording medium such as a card, and more particularly to a recording device having constituent components including a printer unit, which are rationally arranged to heighten the processing efficiency and have high degree of freedom in design and make the device compact.

2. Description of the Prior Art

Card recording devices such as a card printer for recording or printing various image information on a card base of plastic or the like to produce credit cards, license cards and other ID cards have become to be widely used.

In general, the recording device of this kind comprises a card supply stacker for accommodating blank cards, a processing unit including a thermal-transfer printer, and a card discharge container to which a finished card is sent out. These operation components constituting a conventional recording device are arranged along one card transfer passage which generally extends straight horizontally.

The processing unit includes not only the printer, but also a magnetic encoder for magnetically recording information on the card, a laminator for coating the recorded surface of the card, and so on. In any case, all the operation components in the conventional device are placed in a row along the card transfer passage extending straight.

There has been a need for a compact or portable recording device capable of being easily handled and effectively and securely recording desired information on a card. However, in order to make the recording device compact, the conventional device having the operation components arranged linearly on one straight card passage has had no alternative but to narrow the distance between the adjacent operation components. Particularly, there has been a tendency for the conventional device to place the card printer unit close to the card supply stacker in order to make the arrangement compact. That is, the conventional recording device is usually designed to straight feed the blank card from the card supply stacker to the printer unit via the shortest course, even if a card cleaner is present between the card supply stacker and the printer unit.

However, the thermal-transfer printer unit in the recording device of this type generally includes an ink-ribbon cartridge and a printer head, resulting in a large size, and further, the card supply stacker is made large so as to store blank cards as many as possible.

The printer unit and card supply stacker have been attempted to be made compact as a matter of course. However, the device with the compact-made printer unit and card supply stacker is low in efficiency of mass producing the recorded cards and disadvantage in use, because it cannot accommodate a sufficient length of ink ribbon and large numbers of blank cards. Thus, there has been a limit in making the components compact.

Under the aforesaid circumstances, the conventional card recording device necessarily has the whole length larger than at least the total length of the card supply stacker and the printer unit, consequently to be formed like a long square pillar and reduce the degree of freedom of design.

Accordingly, it has been attempted to arrange two horizontal card transfer passages one over another in parallel, so as to place the card printer unit on the upper one of the card transfer passages and the magnetic encoder on the lower card transfer passage, as proposed in Japanese Patent Application Publication No. 09-131944(A). This conventional recording device has a vertical card transfer passage for transferring the card between the upper and lower card transfer passages and card turning means for delivering the card from one of the upper and lower card transfer passages to the other card transfer passage.

Although the conventional recording device having the upper and lower card transfer passages may be reduced in horizontal length (width), the volume of the device cannot be reduced on the whole, rather increased, because the vertical card transfer passage is added to the horizontal card transfer passages. The practical distance through which the card to be processed travels from the entrance (card supply stacker) to the exit (card discharge container) of the device is practically increased, thus decreasing the efficiency of processing the card.

Accordingly, there has been a need for a compact recording device having rational arrangement of the components so as to efficiently produce various ID cards.

OBJECT OF THE INVENTION

An object of the present invention is to provide a high-performance compact recording device for producing various ID cards or the like with high efficiency, having sufficient card-storage capacity, excellent card-transferring performance and high degree of freedom of design.

Another object of the invention is to provide a card recording device capable of stably, securely and efficiently recording various information on one surface or both surfaces of a card by use of a simple driving mechanism.

Still another object of the invention is to provide a card recording device having rational arrangement of a card supply unit capable of storing lots of blank cards and a printer unit for printing or recording various information on the card fed from the card supply unit and capable of further rationally assembling a card discharge unit and other processing units including a magnetic encoder into a space accommodating the card supply unit and printer unit.

Yet another object of the invention is to provide a card recording device capable of dealing with a plurality of cards at one time without hindrance, thereby to mass-produce ID cards with high efficiency.

A further object of the invention is to provide a card recording device capable of turning up the cards stacked in the card supply unit by closing a lid of the card supply unit.

SUMMARY OF THE INVENTION

To attain the objects described above according to the present invention, there is provided a card recording device comprising a card supply unit disposed on a first card transfer passage, card recording means disposed on a second card transfer passage intersecting with the first card transfer passage, and card turning means disposed at the intersection point of the first and second card transfer passages.

The first and second card transfer passages may intersect at right angles, so as to transfer the card from the first card transfer passage to the second card transfer passage and vice versa by holding and turning the card at right angles. This arrangement of the first and second card transfer passages intersecting at right angles enables the distance between the card supply unit and the card turning means and the distance between the card turning means and the card recording means to be practically shortened, thus to make the device compact.

The card fed from the card supply unit is subjected to recording processing at the card recording means and finally discharged to a card discharge container. The card discharge container may be located at the opposite side to the card supply unit with the card turning means or at a third card transfer passage extending radially from the card turning means between the first and second card transfer passages.

The card recording means for recording information on the card may be a printer for printing letters or images on the card and/or a magnetic encoder for magnetically recording information on the card.

There may be used the printer as the first card recording means disposed on the second card transfer passage and the magnetic encoder as the second card recording means disposed on the third card transfer passage extending radially from the intersection point of the first and second card transfer passages. An IC writer, magnetic encoder or printer may be optionally used as the first or second recording unit.

The first and second card transfer passages do not always intersect at right angles and may be intersected with each other at an acute or obtuse angle, so as to make the first, second and third card transfer passages extend radially from the card turning means in the light of the design of the device.

Since the card recording means and card discharge container are disposed on either side of the card turning means on the first card transfer passage and the card recording means is disposed on the second card transfer passage substantially perpendicular to the first card transfer passage, it is possible to make the card recording device compact and transfer the card to be handled with high efficiency. Besides, since the card can be changed in direction by the card turning means, information can be arbitrarily recorded on one or both surfaces of the card.

Other and further objects of this invention will become obvious upon an understanding of the illustrative embodiments about to be described or will be indicated in the appended claims, and various advantages not referred to herein will occur to one skilled in the art upon employment of the invention in practice.

BRIEF DESCRIPTION OF THE DRAWINGS

FIG. 3A through FIG. 3D shows a process of dealing with a card in the device of the first embodiment of the invention.

DESCRIPTION OF THE PREFERRED EMBODIMENTS

The recording device according to this invention has an excellent function of dealing with a card to be processed with high efficiency and comprising card transfer passages and operation components rationally arranged so as to make the device compact. Although a plastic card is used as a recording medium in the recording device of the invention, the recording device can handle various types of recording media to produce credit cards, license cards, ID cards and so forth. Hence, the type, material and shape of the card to be dealt with and the method of recording information on the card are by no means limited in this invention.

Figure 1:
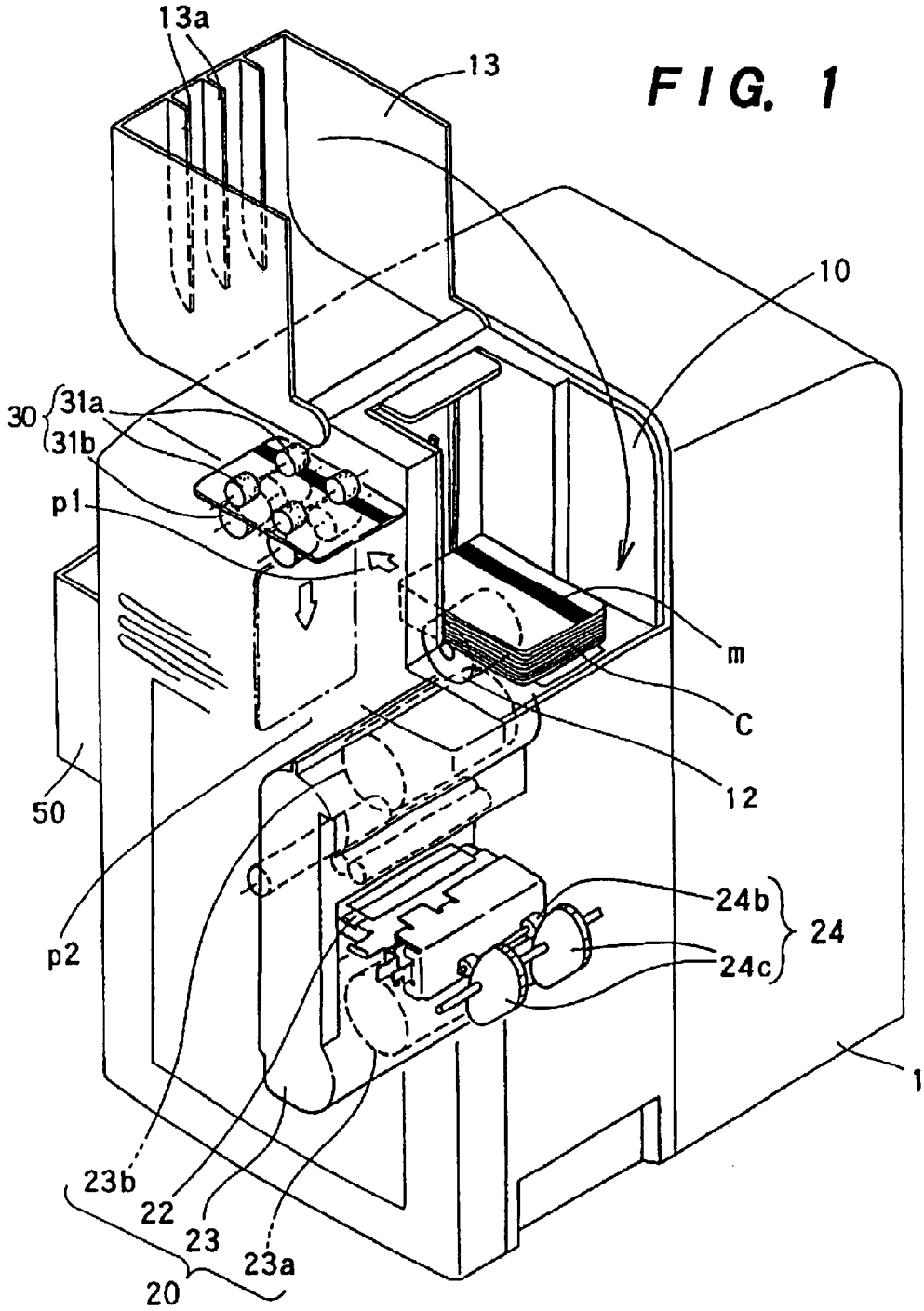
FIG. 1 is a schematic see-through view in perspective of the card recording device according to this invention.
Figure 2:
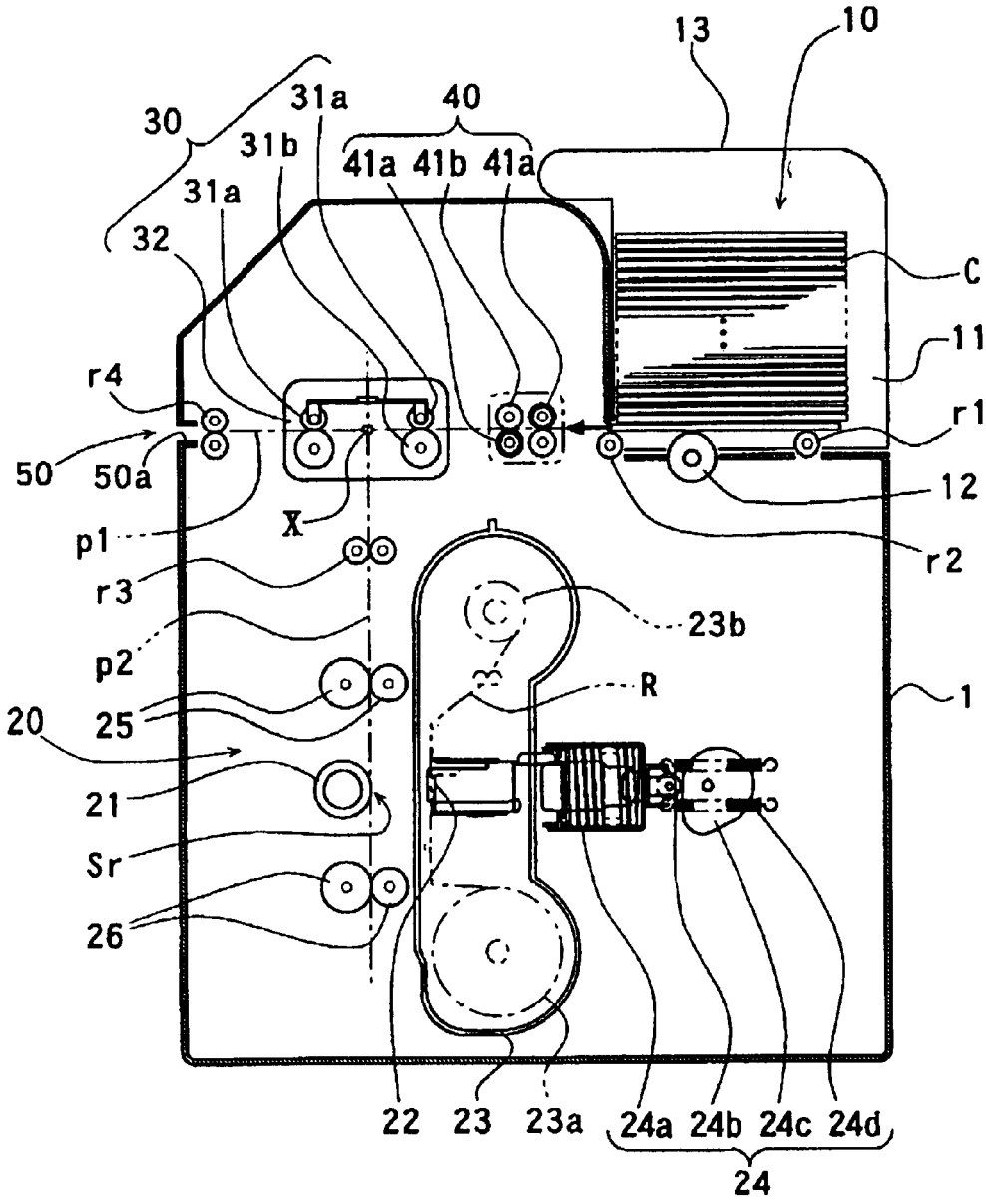
FIG. 2 is a schematic front view showing a first embodiment of the card recording device having card transfer passages intersecting at right angles according to this invention.

The card recording device illustrated in FIG. 1 and FIG. 2 as the first embodiment comprises a first card transfer passage p1 arranged substantially horizontally in a device housing 1, a card supply unit 10 for storing one or more blank cards (recording media) C, a second card transfer passage p2 arranged substantially perpendicularly to the first card transfer passage p1, recording means 20 for recording information on at least one surface of the card C, and card turning means 30 disposed at the intersection point X of the first and second card transfer passages p1 and p2.

The card supply unit 10 comprises a card supply stacker 11 for storing the cards in their piled state, a kick roller 12 disposed on the bottom of the card supply stacker 11, which is rotatable to send out the cards one by one, and a lid 13 openably mounted on the card supply stacker 11. The card supply unit 10 is located at one end of the first card transfer passage p1.

The card supply stacker 11 has a card exit slot 11a for allowing only one card to pass therethrough at one time, so that only the lowermost of the cards stacked in the card supply stacker 11 can be sent out to the first card transfer passage p1 by rotating the kick roller 12 being in contact with the lowermost card.

The lid 13 is pivoted on the upper part of the device housing 1 so as to open upward. The lid 13 has a card aligning member 13a, so that the cards contained in the card supply stacker 11 can be pushed forward by the card aligning member 13a when closing the lid 13, consequently to true up the front edges of the cards.

The recording means 20 in this embodiment is a thermal-transfer printer for thermally printing information such as letters or images on one surface of the card with at least one kind of thermal-transfer ink. The recording means 20 includes a platen roller 21 disposed at a recording position Sr defined on the second card transfer passage p2, a thermal printing head 22 mounted opposite to the platen roller 21 so as to be movable fore and aft relative to the platen roller 21, and an ink-ribbon cartridge 23 containing an ink ribbon R applied with one or more kinds of thermal-transfer inks. On the second card transfer passage p2, there are disposed a pair of card transfer rollers 25 and 26 synchronously rotatable to move the card to and from relative to the recording position Sr.

The ink ribbon R contained in the ink-ribbon cartridge 23 is fed from a ribbon supply reel 23a to a ribbon take-up reel 23b through between the platen roller 21 and the thermal printing head 22. When printing information such as letters and images on the card moving along the second card transfer passage p2, the thermal printing head 22 moves toward the platen roller 21 to press the ink ribbon R against the card R moved along the second passage p2 by rotating the platen roller 21 while heating selectively heating elements of the thermal printing head 22 being in indirect contact with the card across the ink ribbon R. Consequently, the thermal-transfer ink applied to the ink ribbon R is thermally transferred selectively to the recording surface of the card C to produce the desired letters or images on the card.

The reciprocating motion of the thermal printing head 22 relative to the platen roller 21 is fulfilled by means of a head reciprocating driver 24 which includes a holder 24a for detachably holding the thermal head 22, a follower roller 24b held by the holder 24a, a non-circular cam 24c which rotates while coming into contact with the follower roller 24b, and a spring 24d for pressing the holder 24a against the cam 24c. The thermal printing head 22 is retained within a detachable head unit held by the holder 24a in this embodiment, but the structure of detachably holding the thermal printing head 22 is not specifically limited thereto.

The thermal-transfer recording method and structure of the thermal transfer printer as noted above may be attained by using the technique of a conventional thermal-fusing type thermal-transfer printer or thermal-sublimitation type thermal-transfer printer.

The card turning means 30 located at the intersection point X of the first card transfer passage p1 and the second card transfer passage p2 has the functions of not only transferring the card C from the first card transfer passage p1 to the second card transfer passage p2 and vice versa, but also turning over the card to print information on both sides of the card.

The card turning means 30 comprises a pair of pinch rollers 31a and 31b for holding the card therebetween, and a turning frame 32 rotatable about the intersection point X of the first and second card transfer passages p1 and p2. The pinch rollers 31a and 31b are rotatably retained by the turning frame 32.

The pinch rollers 31a and 31b come in press contact with each other on the first card transfer passage p1 when the turning frame 32 assumes its horizontal posture and on the second card transfer passage p2 when the turning frame 32 is in its vertical position. One of the pinch rollers 31a and 31b is a driving roller directly connected to a driving system (not shown) and the other is driven by the driving roller, so that these pinch rollers are rotated in synchronism with the turning frame 32 by the driving system.

Between the card supply unit 10 and the card turning means 30 on the first card transfer passage p1, there is disposed a cleaner 40 for cleaning the card traveling along the first card transfer passage p1. The cleaner 40 in this embodiment includes a cleaning roller 41a formed of rubber or other material having moderate sticky, and a press roller 41b coming in contact with the cleaning roller 41a. With this cleaner 40, dust or any other foreign substances possibly adhering to the card can be wiped from the card passing therethrough.

In the drawings, r1 and r2 denote card guide rollers heling in sending out the card from the card supply stacker 11, and r3 denotes a card guide roller disposed between the card turning means 30 and the recording means 20. These guide rollers r1, r2 and r3 are not indispensible to this invention.

The recording device of this embodiment further comprises a card discharge unit 50 disposed at the downstream end of the first card transfer passage p1, which is opposite to the card supply unit 10 placed on at the upperstream end of the first card transfer passage p1 so as to receive the finished card on which the desired information was recorded.

The card discharge unit 50 includes a card discharge slot 50a formed in the housing 1 on the extension of the first card transfer passage p1, and a card discharge roller r4. Outside the card discharge slot 50a in the housing 1, there may be mounted a card discharge stacker.

All the components of the aforenoted recording device can be driven by a simple driving mechanism, but a measure for driving the components of the recording device should not be understood as being limitative. For example, it is possible to drive the kick roller 12 of the card supply unit 10 and the turning frame 32 of the card turning means 30 by one driving means, and the press roller 41b of the cleaner 40, driving pinch roller 31b and card discharge roller r4 by another driving means. As driving means for the components of this recording device, any type of power transmission system including one or more electromagnetic clutches and actuators, gears and the like may be used. Although a driving system for rotating the cam 24c of the head reciprocating driver 24 in the information recording means 20 is operated by an independent driving source, it may be driven by a driving source for transferring the card by use of an electromagnetic clutch. Also, for the purpose of handling the cards at successive intervals, the driving systems for the first and second card transfer passages p1 and p2 may preferably be operated by separate driving sources, so that, when one card is being processed in the second card transfer passage p2, a succeeding card is fed from the card supply unit 10 into the first card transfer passage p1 and put on standby there, thus to speed up the rate of processing.

The manner of recording information on a card in the aforenoted recording device will be described hereinbelow with reference to FIGS. 3A through 3D.

FIG. 3A illustrates the initial state in which a plurality of blank cards C are loaded in the card supply stacker 11 of the card supply unit 10. Upon receiving a card producing command, the device starts to operate by rotating the kick roller 12 of the card supply unit 10, consequently to send out only the lowermost card c1 from the card supply stacker 11 to the first card transfer passage p1. In the drawings, the surface f (upper face) to be printed with the desired information is symbolically depicted by dots.

When the center of the card c1 traveling along the first card transfer passage p1 arrives at the intersecting point X of the first and second card transfer passages p1 and p2, forwarding of the card along the first card transfer passage is discontinued, and then, the turning frame 32 is turned with the card c1 held between the pinch rollers 31a and 31b as shown in FIG. 3B. In this illustrated embodiment, the turning frame 32 rotates counterclockwise at 270 degrees in order for printing the information on the surface f of the card c1, it may rotate either clockwise or counterclockwise.

Figure 3C:
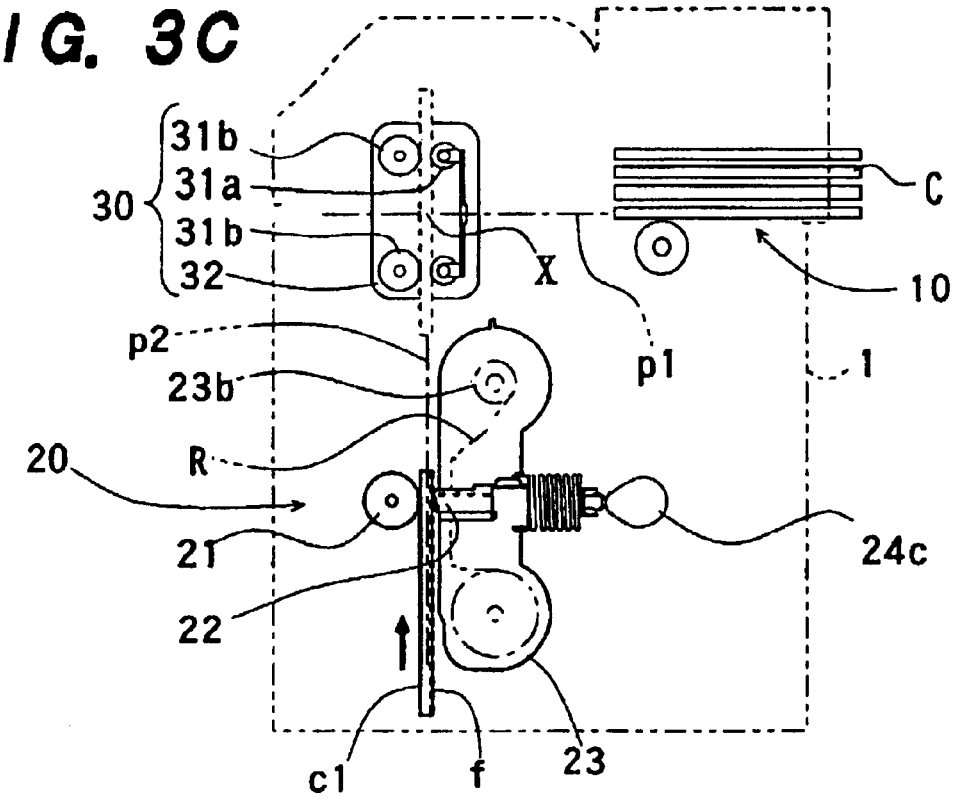

When the card c1 is aligned with the second card transfer passage p2 as the result of rotating the turning frame 32 as shown by the dotted line in FIG. 3C, the pinch rollers 31a and 31b of the card turning means 30 are driven to send out the card c1 toward the information recording means 20. The card c1 from the card turning means 30 is forwarded until a print starting point predetermined on the card c1 (the upper end part of the card in the illustrated embodiment) reaches the recording position Sr.

Subsequently, the desired information is printed on the card c1 in such a manner that the thermal printing head 22 is thrust toward the card by operating the head reciprocating driver 24 of the information recording means 20 to come into press contact with the surface f of the card through the ink ribbon R, and then, the card c1 is moved toward the card turning means 30 as shown by the arrow in FIG. 3C, while thermally driving the thermal printing head 22 being in contact with the card. As a result, the desired information is recorded on the surface f of the card.

Figure 3D:
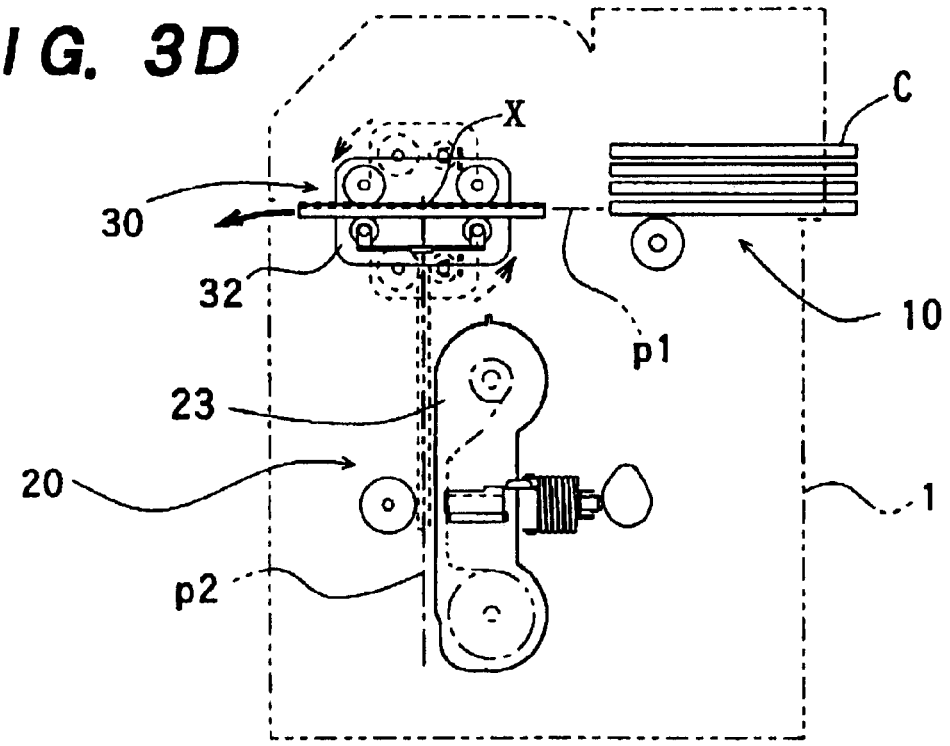

At the time that the recording of information on the card is completed, the card is caught at its upper end by the lower pair of pinch rollers 31a and 31b of the card turning means 30 assuming its vertically standing posture as shown by the dotted line in FIG. 3D, and then, the card is led into the card turning means 30 by rotating the pinch rollers 31a and 31b. Thereafter, the card is turned at right angles to the horizontal position by rotating the card turning means 90 degrees counterclockwise as shown by the dotted arrow in FIG. 3D. Then, the card is discharged with the recorded surface f upward to the card discharge unit 50 located at the terminal of the first card transfer passage p1 as shown by the solid arrow in FIG. 3D.

The recording of desired information on one surface of the card is fulfilled as stated above. Information can be recorded or printed on the other surface of the card in such a manner that the card which arrives at the card turning means 30 from the information recording means 20 as shown by the solid line in FIG. 3D is turned 180 degrees and sent back the card to the information recording means 20 as shown in FIG. 3C.

The reason why the card c1 arriving at the card turning means 30 from the card supply unit 10 is rotated counterclockwise 270 degrees before being sent to the information recording means 20 in the illustrated embodiment is that the case wherein the card rotates clockwise is the same as that of rotating counterclockwise since the card is handled on the assumption that it is required to be discharged with its recorded surface upward in this embodiment. Thus, the direction in which the card rotates at the card turning means 30 should not be understood as being limited only to the illustration, and may be decided as required.

As described above, the arrangement of the first card transfer passage p1 crossing the second card transfer passage p2 according to this invention enables the recording device to be made compact and easy to handle in comparison with a conventional recording device. That is, the conventional recording device generally has a single straight card transfer passage resulting in the configuration of the device shaped in a long square pillar on the whole, which adds to the size, calls for a large space just for installing the device in use, and renders the handling of the device difficult.

Furthermore, the recording device of the invention has an additional function of recording or recording or printing information on both surfaces of the card by making use of the card turning means 30 provided primarily for transferring the card from the first card transfer passage p1 to the second card transfer passage p2 and vice versa. Hence, the device of the invention makes it possible to record or print information on both surfaces of the card without need for additional means having only a single function of turning the card upside down, but not transferring the card between the passages.

Although the finished card recorded with the desired information is discharged to the card discharge unit 50 located on the downstream side of the first card transfer passage p1 in the aforementioned first embodiment, the card discharge unit 50 may be disposed below the card supply unit 10 as the second embodiment shown in FIG. 4.

Figure 4:
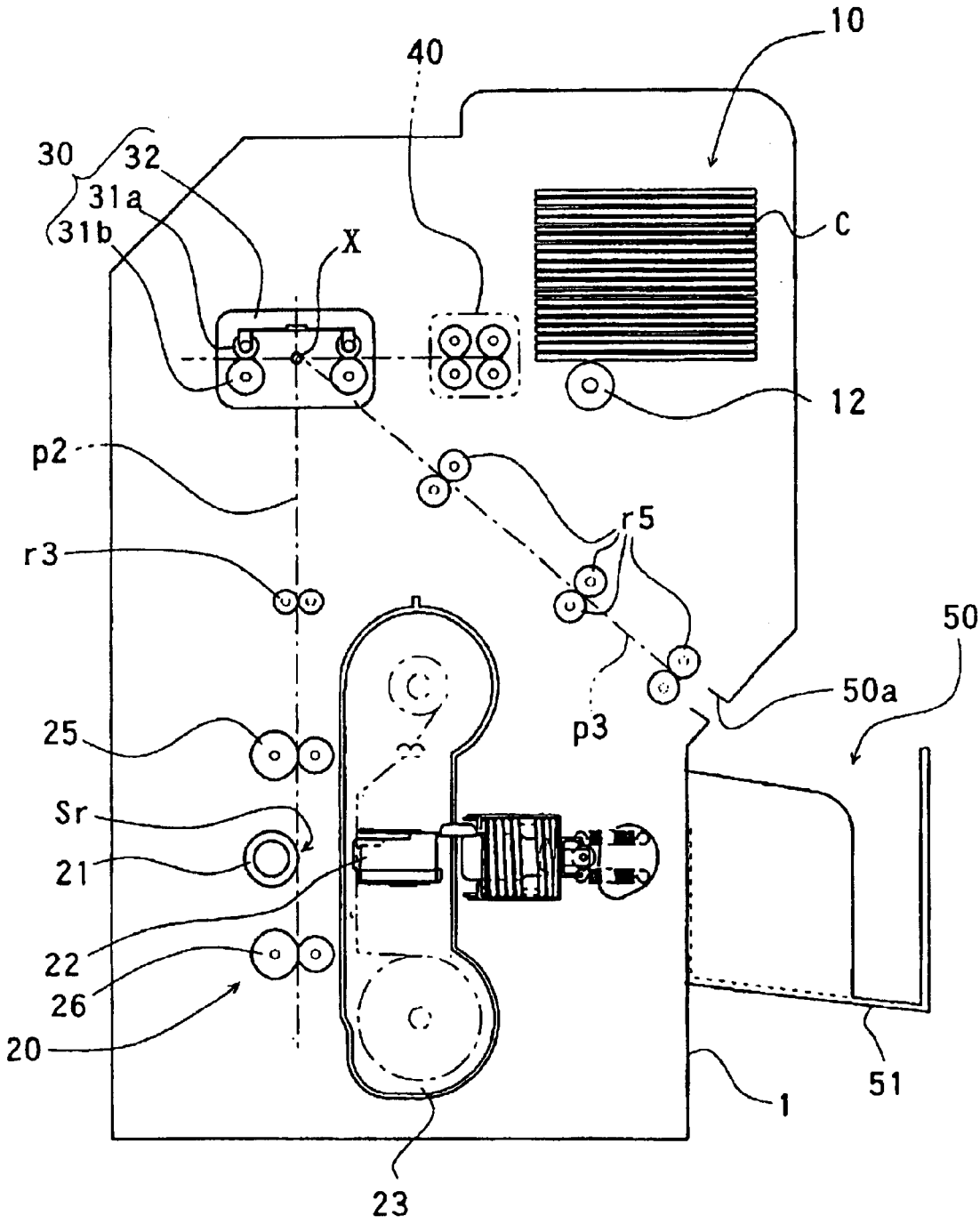
FIG. 4 is a schematic front view showing a second embodiment of the card recording device having card transfer passages intersecting at right angles according to this invention.

In the second embodiment of FIG. 4, a third card transfer passage p3 extends aslant downward from the intersection point X of the first and second card transfer passages p1 and p2, so as to discharge the finished card through an exit port 50a to a discharge container 51 attached to the outside of the device housing 1. The third card transfer passage p3 is substantially defined by card transfer rollers r5 in the illustrated embodiment, but may be formed of flat guide plates or the like.

The second embodiment can make the recording device compact as well as the foregoing first embodiment. The elements indicated by like numerical symbols with respect to those of the first embodiment have analogous structures and function to those of the first embodiment and will not be described in detail again.

Figure 5:
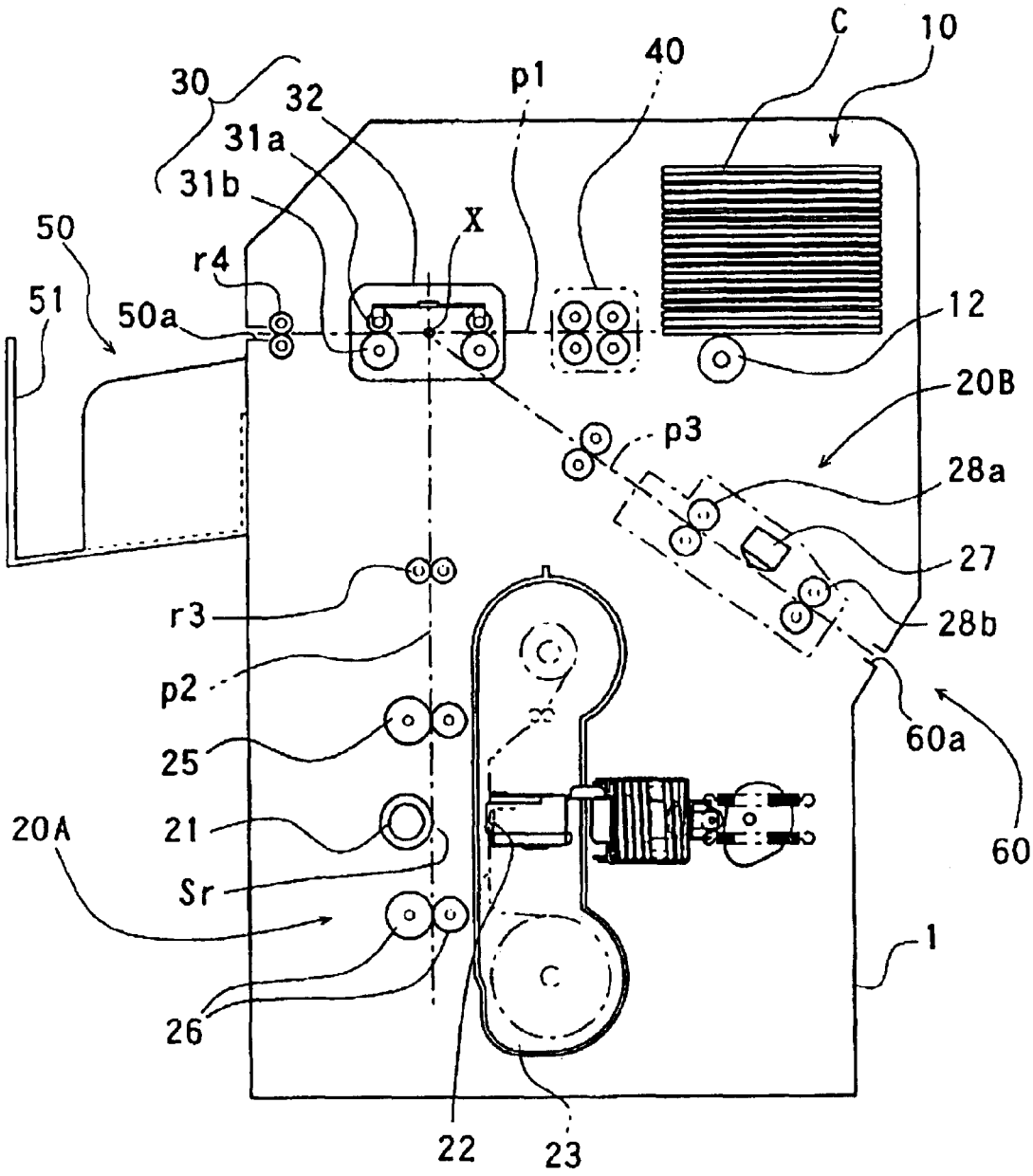
FIG. 5 is a schematic front view showing a third embodiment of the recording device of the invention.

The third card transfer passage p3 may be provided with another information recording means 20B as shown in FIG. 5 as the third embodiment of the invention. That is, the third embodiment has the second card transfer passage p2 with the first information recording means 20A and the third card transfer passage p3 with the second information recording means 20B.

The second information recording means 20B in the third embodiment may include an information writing head 27 such as of a magnetic encoder for magnetically writing information on a recording medium such as a magnetic strap m which is seen in an ordinary credit card or the like as illustrated in FIG. 1.

If the information card to be processed in an IC card, the information writing head 27 may be formed of a terminal unit for an IC writer for writing information on an IC chip incorporated in the IC card.

The second information recording medium 20B in this embodiment includes card transfer rollers 28a and 28b being in contact with each other on the third card transfer passage p3 in addition to the information writing head 27, but the component elements constituting the second information recording means 20B and the method of writing the information on the card are not limited thereto. In the case of employing the magnetic encoder, in general, it performs initializing of the magnetic strap, writing of the desired information data, verifying of read-out data and other necessary processes while passing the card through the magnetic encoder one or more times. At that time, the card is moved selectively forward and backward along the third card transfer passage p3 by operating the card transfer rollers 28a and 28b in synchronism with the operation of the magnetic encoder in accordance with necessities of the processing.

The third embodiment shown in FIG. 5 has the card discharge unit 50 (card discharge container 51) located on the downstream side of the first card transfer passage p1 similarly to the first embodiment, so as to send out the finished card to the card discharge container 51 through the exit port 50a formed in the device housing 1.

Figure 6:
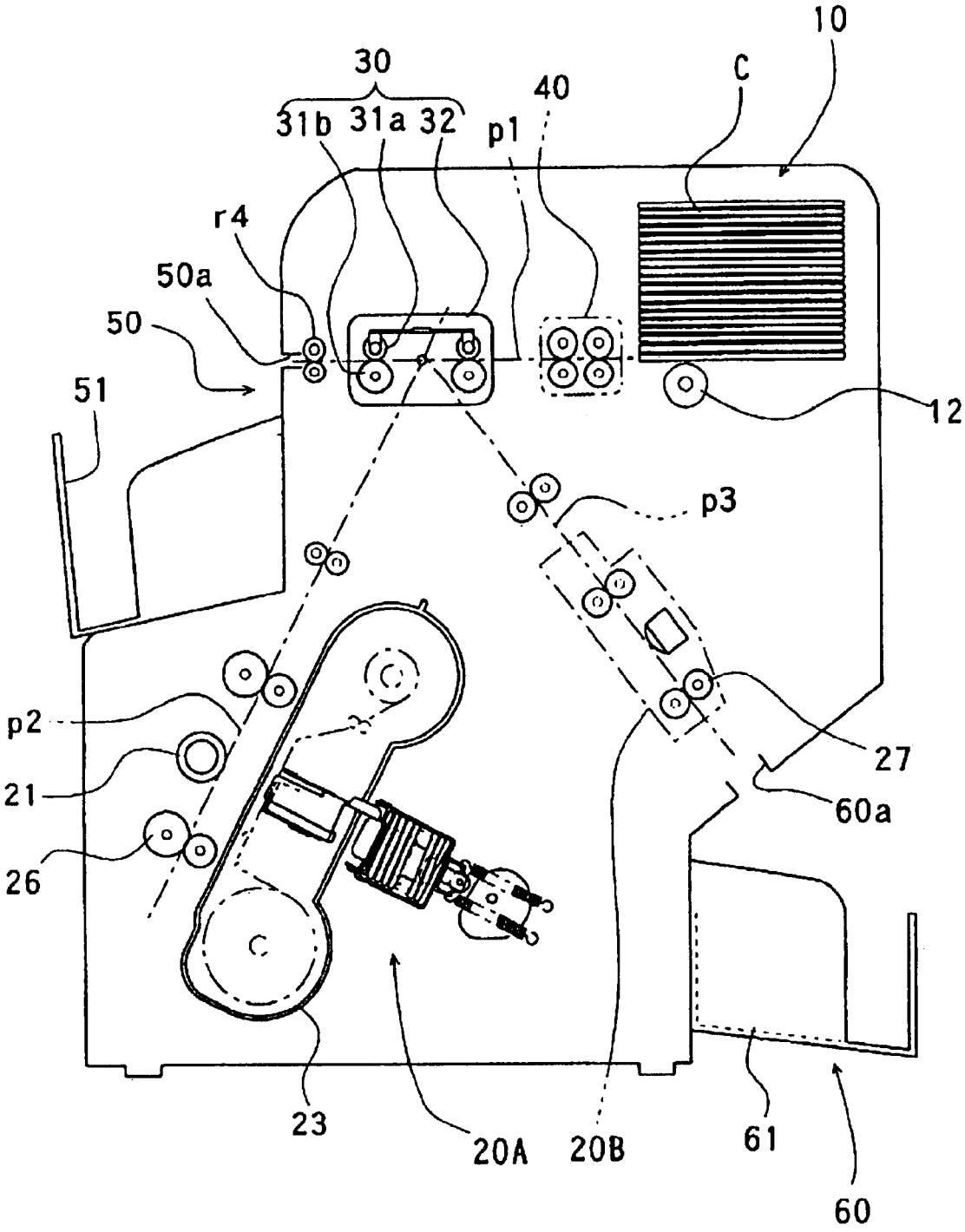
FIG. 6 is a schematic front view showing a fourth embodiment of the recording device of the invention.

At the terminal end of the third card transfer passage p3, there is formed an error-card rejecting unit 60 so as to send out an error card thereto through an opening 60a formed in the housing 1. The error-card rejecting unit 60 may include an error-card container as shown in FIG. 6.

On the third card transfer passage p3, guide rollers r6 are mounted between the card turning means 30 and the second information means 20B. The identical or similar component elements of this embodiment are denoted by like numerical symbols.

In this embodiment, a printer unit serving as the first information recording means 20A is installed on the second card transfer passage p2, and the second recording means 20B such as the magnetic encoder or IC writer as touched upon above is installed on the third card transfer passage p3, but it is needless to say that, as a countermeasure, it is desirable to install the second recording means 20B on the second card transfer passage p2 and the printer unit on the third card transfer passage p3.

According to the third embodiment described above, since the second recording means 20B is rationally assembled between the first and second card transfer passages p1 and p2, the recording device having multiple function can be made compact.

The fourth embodiment shown in FIG. 6 is modified on the basis of the embodiment of FIG. 5, in which the first and second card transfer passages p1 and p2 intersect at an obtuse angle and the third card transfer passage p3 extends aslant from the intersection point X of the first and second card transfer passages p1 and p2 between the first and second card transfer passages. That is, the first to third card transfer passages p1 to p3 extend radially from the intersection point X i.e. the center of the card turning means 30.

In this fourth embodiment, the second card transfer passage p2 is inclined at an angle and located substantially below the card discharge unit 50 to which the finished card is discharged, and the third card transfer passage p3 is located in its inclined state substantially below the card supply unit 10 and led to the error-card rejecting unit 60. Thus, such remarkably rational arrangement of the card transfer passages and other processing units can make the device compact.

The first information recording means 20A in this embodiment may be formed of a thermal-transfer printer unit capable of printing information on at least one surface of the given card, and the second information recording means 20B may be formed of a magnetic encoder or IC writer capable of recording magnetically or electronically information on the card, as illustrated by way of example. However, the first and second information recording means are by no means limited to these only. Of course, it is desirable to mount the second information recording means 20A on the second card transfer passage p2 and the printer unit on the third card transfer passage p3 as a countermeasure.

Figure 7:
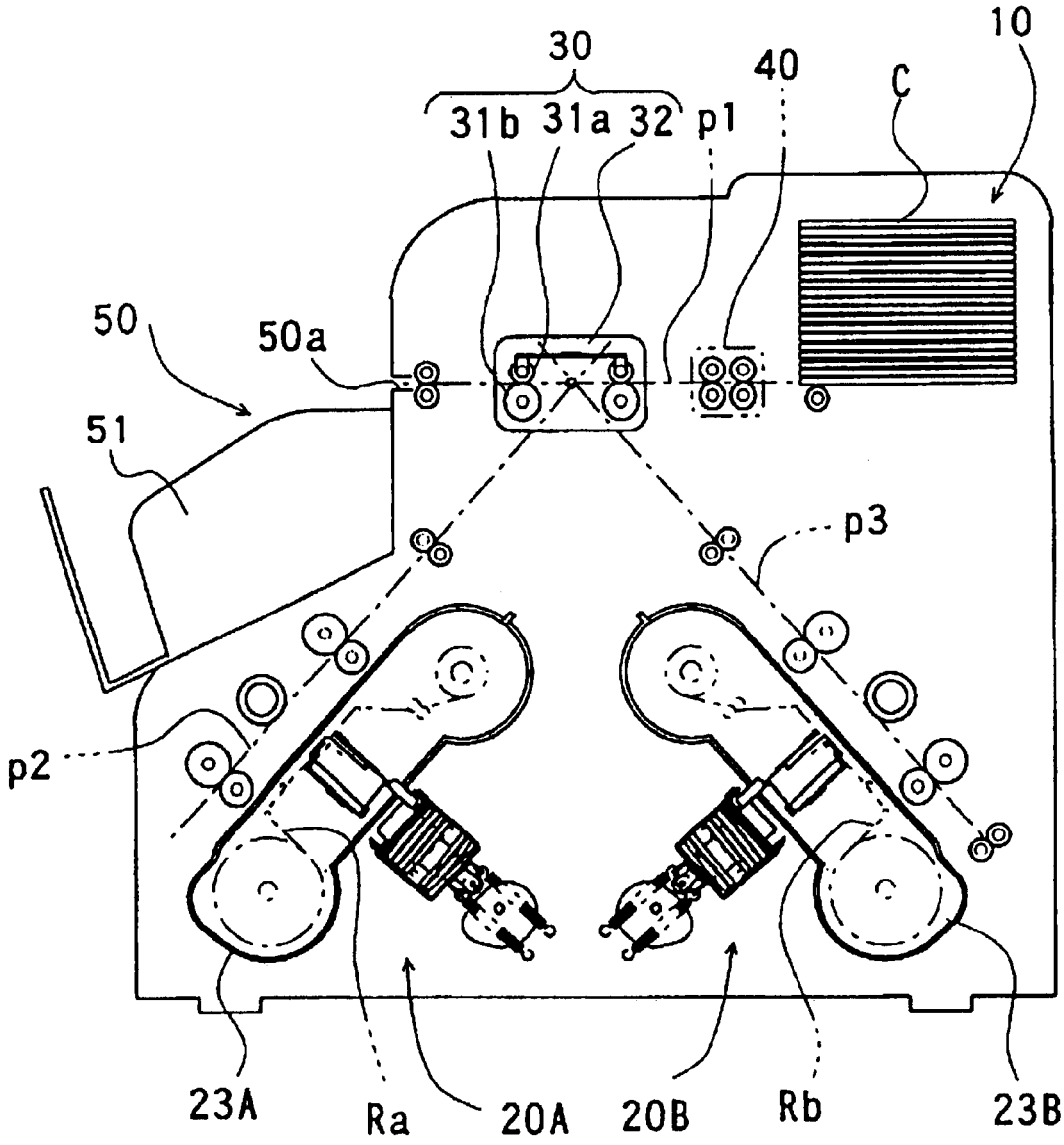
FIG. 7 is a schematic front view showing a fifth embodiment of the recording device of the invention.

In the fifth embodiment shown in FIG. 7, thermal-transfer printer units are disposed one on the card transfer passages p2 and p3 as the information recording means 20A and 20B.

The recording device having two printer units makes it possible to fulfill unctions of effecting monochrome printing for letters or characters with one printer unit of the first recording means 20A and multi-color printing for full-color pictures with the other printer unit of the second recording means 20B. In this case, an ink-ribbon cartridge 23A of the first recording means 20A may be loaded with, for example, a thermal-fusing ink ribbon Ra of a single color, e.g. black, and another ink-ribbon cartridge 23B of the first recording means 20B may be loaded with, for example, a thermal-sublimation color ink ribbon Rb of three primary colors, e.g. yellow, magenta and cyan. Either of ink ribbons may be provided with a transparent protecting seal to be protectively coated on the recorded surface of the card. These measures for printing the desired information on the card can be accomplished by conventional techniques, and thus, are not specifically limited thereto.

This fifth embodiment has no error-card rejecting unit, but may have the same error-card rejecting unit located at the terminal end of the third card transfer passage p3 as seen in the foregoing embodiment. Also in this embodiment, the elements indicated by like numerical symbols with respect to those of the aforementioned embodiments have analogous structures and function to those of the foregoing embodiments and will not be described in detail again.

Figure 8:
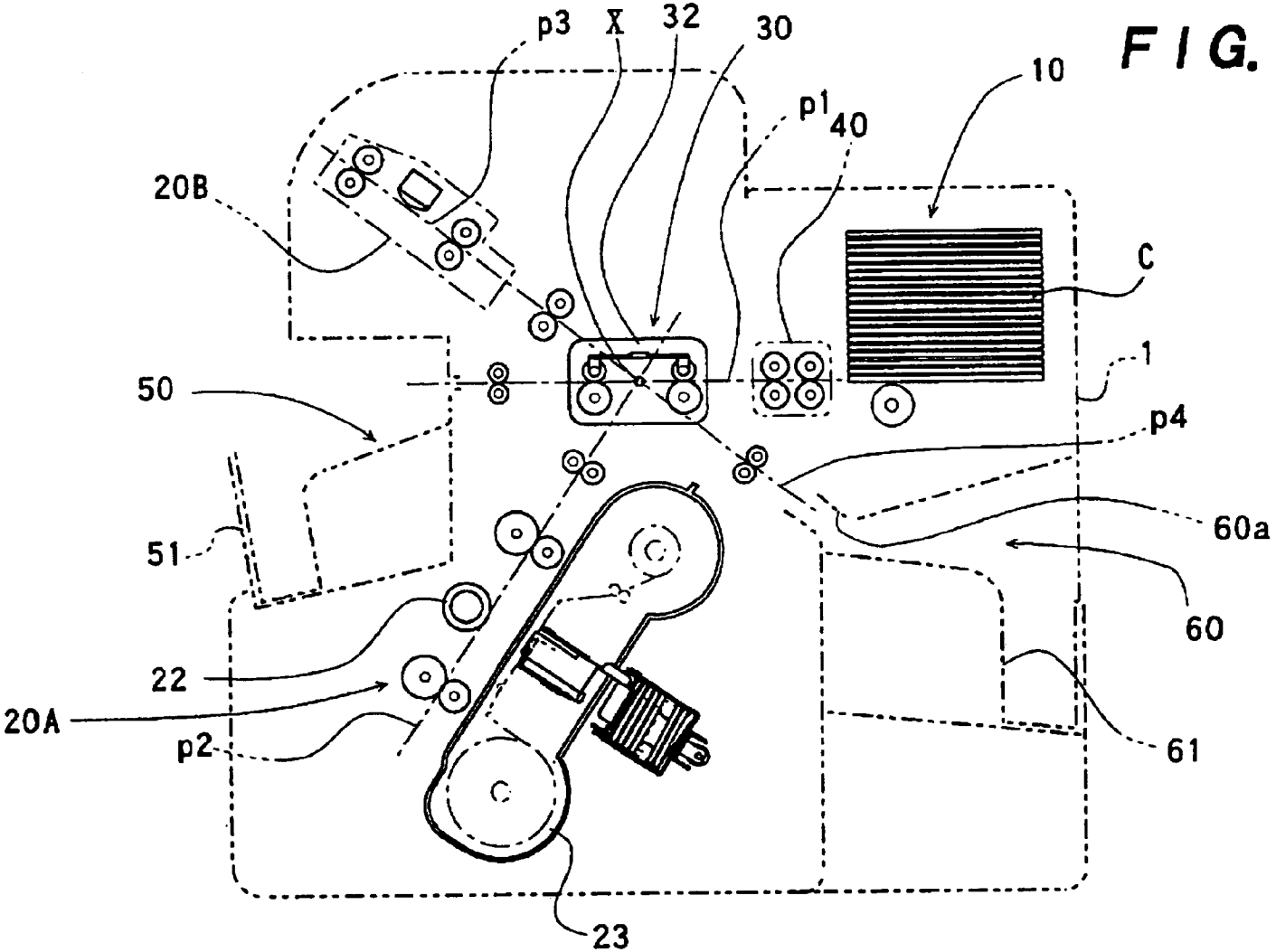
FIG. 8 is a schematic front view showing a sixth embodiment of the recording device of the invention.

The sixth embodiment shown in FIG. 8 is further derived from the fifth embodiment of FIG. 7, in which the first, second and third card transfer passage p1, p2 and p3 extend radially from the intersection point X thereof. That is, the card turning means 30 is positioned on the midway of the first card transfer passage p1 extending substantially horizontally, so that the turning frame 32 can rotate about the point X on the first card transfer passage p1. The second card transfer passage p2 extends aslant upward from the intersection point X, and the third card transfer passage p3 extends aslant downward from the intersection point X. In this embodiment, a thermal-transfer printer unit serving as the first information recording means 20A is mounted on the second card transfer passage p2, and a magnetic encoder serving as the second information recording means 20B is mounted on the third card transfer passage p3.

The card discharge unit 50 including the card discharge container 51 is formed at the terminal end on the downstream side of the first card transfer passage p1 which is opposite to the card supply unit 10 across the point X The error-card rejecting unit 60 to which an error card, which will possibly, but not frequently, be caused, is ejected is formed at the terminal end of a fourth card transfer passage p4 extending aslant downward from the point X in the direction opposite to the second card transfer passage p2. When an error in recording information on the given card occurs in any processing unit, the card is ejected as an error card to the error card container 61 of the error-card rejecting unit 60 through the fourth card transfer passage p4 and the opening 60a formed in the device housing. In this embodiment, the elements indicated by like numerical symbols with respect to those of the aforementioned embodiments have analogous structures and function to those of the foregoing embodiments and will not be described in detail again.

Such rational arrangement of the first to fourth card transfer passages p1 to p4 extending radially from the rotation axis (point X) of the card turning frame 32 also makes the multifunctional recording device compact similarly to the foregoing embodiments.

Although the first card transfer passage p1 is arranged horizontally in the illustrated embodiments as described above, it is not necessarily the horizontal and may be inclined at an angle for each purpose.

As is apparent from the foregoing description, since the recording device according to this invention makes the first card transfer passage with the card supply unit intersect the second card transfer passage with the first information recording means at an obtuse angle, acute angle or right angles, the component elements constituting the device can be rationally arranged without decreasing capacity of containing blank cards, thus making the device compact without lowering performance of fulfilling necessary functions of recording or printing desired information on a given card. Furthermore, since the recording device of the invention has the card turning means located at the intersection point of the first and second card transfer passages, recording or printing of information can be readily and stably effected with high efficiency on either or both of the surfaces of the card by use of a simple driving and controlling system.

Further, the recording device of the invention having rational arrangement of the card supply unit for containing blank cards and one or more printer units serving as information recording means allows the second information means such as a magnetic encoder and IC writer, finished-card discharge unit, error-card rejecting unit and other necessary components to be rationally incorporated therein. Besides, the moving components in the recording device of the invention can be easily and stably driven with high efficiency by use of a simple driving system including one or two driving means such as a motor at most. Besides, the blank cards stacked in the card supply unit can easily and securely be aligned merely by closing the lid of the card supply unit, thus rendering the handling of the device easy.

It is to be understood that the invention is not limited to its application to the details of constriction and arrangement of parts illustrated in the accompanying drawings, since the invention is capable of other embodiments and of being practiced or carried out in various ways. Also it is to be understood that the phraselogy or terminology employed herein is for the purpose of description and not of limitation.

What is claimed is:

1. A card recording device comprising*:* a first card transfer passage *for transferring a card*, a card supply unit for containing one or more cards, said card supply unit being disposed on [a] *the* first card transfer passage[.]*;* a second card transfer passage intersecting with said first card transfer passage at an intersection point[.]*;*

*a* card recording means for [recording] *thermal-transferring* information on the card [fed from said card supply unit], said card recording means being disposed on said second card transfer passage[.]*;* and

*a* card turning means for transferring or turning the card, said card turning means being rotatably disposed at said intersection point of said first and second card transfer passages.

2. A card recording device according to claim 1, wherein said first and second card transfer passages intersect at right angles.

3. A card recording device according to claim 1, wherein said first card transfer passage extends substantially horizontally, and said second card transfer passage extends substantially vertically.

4. A card recording device according to claim 1, wherein said first and second card transfer passages extend radially from said intersection point of said passages.

5. A card recording device according to claim 1, wherein said card supply unit is located at one end of said first card transfer passage, and further comprising a card discharge unit located at the other end of said first card transfer passage.

6. A card recording device according to claim 2, wherein said card supply unit is located at one end of said first card transfer passage, and further comprising a card discharge unit located at the other end of said first card transfer passage.

7. A card recording device according to claim 3, wherein said card supply unit is located at one end of said first card transfer passage, and further comprising a card discharge unit located at the other end of said first card transfer passage.

8. A card recording device according to claim 4, wherein said card supply unit is located at one end of said first card transfer passage, and further comprising a card discharge unit located at the other end of said first card transfer passage.

9. A card recording device according to claim 1, further comprising a cleaner for cleaning the card fed from said card supply unit, said cleaner being disposed between said card supply unit and said card turning means on said first card transfer passage.

10. A card recording device according to claim 5, further comprising a cleaner for cleaning the card fed from said card supply unit, said cleaner being disposed between said card supply unit and said card turning means on said first card transfer passage.

11. A card recording device according to claim 1, wherein said [information] *card* recording means is a thermal-transfer printer.

12. A card recording device according to claim 5, wherein said [information] *card* recording means is a thermal-transfer printer.

13. A card recording device according to claim 9, wherein said [information] *card* recording means is a thermal-transfer printer.

14. A card recording device comprising a first card transfer passage, a card supply unit for containing one or more cards, said card supply unit being disposed on a first card transfer passage, a second card transfer passage intersecting with said first card transfer passage at an intersection point, first card recording means for recording information on the card, said first card recording means being disposed on said second card transfer passage, a third card transfer passage intersecting with said first and second card transfer passages at an intersection point, second card recording means for recording information on the card, said second card recording means being disposed on said third card transfer passage, and card turning means for transferring or turning the card, said card turning means being rotatably disposed at said intersection point of said first, second and third card transfer passages.

15. A card recording device according to claim 14, wherein said first and second card transfer passages intersect at right angles.

16. A card recording device according to claim 14, wherein said first card transfer passage extends substantially horizontally, and said second card transfer passage extends substantially vertically.

17. A card recording device according to claim 14, wherein said first, second and third card transfer passages extend radially from said intersection point of said passages.

18. A card recording device according to claim 14, wherein said card supply unit is located at one end of said first card transfer passage, and further comprising a card discharge unit located at the other end of said first card transfer passage.

19. A card recording device according to claim 14, wherein said card supply unit is located at one end of said first card transfer passage, and further comprising a card discharge unit located on said third card transfer passage.

20. A card recording device according to claim 14, comprising a card discharge unit disposed on one of said first to third card transfer passages, and an error-card rejecting unit disposed on the other one of said first to third card transfer passages.

21. A card recording device according to claim 14, further comprising a cleaner for cleaning the card fed from said card supply unit, said cleaner being disposed between said card supply unit and said card turning means on said first card transfer passage.

22. A card recording device according to claim 14, wherein one of said first and second [information] *card* recording means is a thermal-transfer printer, and the other [information] *card* recording means is a magnetic encoder.

23. A card recording device according to claim 14, wherein one of said first and second [information] *card* recording means is a thermal-transfer printer, and the other [information] *card* recording means is an IC writer.

24. A card recording device according to claim 14, wherein said first and second [information] *card* recording means [arc] *are* thermal-transfer printers.

25. A card recording device according to claim 24, wherein one of said first and second [information] *card* recording means is a thermal-fusing type thermal-transfer printer, and the other [information] *card* recording means is a thermal-sublimation type thermal-transfer printer.

26. A card recording device according to claim 14, wherein said card supply unit is provided with a lid having a card aligning member to push forward the cards stacked in said card supply unit when closing said lid.

*27. A card recording device according to claim 1, wherein said first card transfer passage is not horizontal.*

*28. A card recording device according to claim 11, wherein said thermal transfer printer is a thermal fusing transfer printer.*

*29. A card recording device according to claim 11, wherein said thermal transfer printer is a thermal sublimation transfer printer.*

*30. A card recording device according to claim 1, wherein said card turning means is rotatable such that either side of said card can be faced on said second card passage.*

*31. A card recording device according to claim 1, wherein said card turning means rotates exactly at said intersection point.*

*32. A card recording device according to claim 1, further includes a cleaner for cleaning the card, said cleaner being disposed on said first card transfer passage.*

*33. A card recording device according to claim 1, further includes a platen roller disposed at a recording position defined on said second card transfer passage.*

*34. A card recording device according to claim 33, further includes a reciprocating driver movable with respect to said platen roller.*

*35. A card recording device according to claim 1, further includes a ribbon to be pressed against the card moved along said second card transfer passage.*

*36. A card recording device according to claim 35, wherein said ribbon is contained in a ribbon cartridge.*

*37. A card recording device according to claim 1, wherein said first card transfer passage is horizontal.*

*38. A card recording device comprising:*

*a first card transfer passage;*

*a card supply unit for containing one or more cards, said card supply unit being disposed on the first card transfer passage;*

*a second card transfer passage intersecting with said first card transfer passage at an intersection point;*

*a printer unit having at least a roller for transferring information on the cards, said printer unit being disposed on said second card transfer passage; and*

*a card turning device having at least a roller for transferring or turning the card, said card turning device being rotatably disposed at said intersection point of said first and second card transfer passage.*

*39. A card recording device according to claim 38, wherein said printer unit is a thermal transfer printer unit.*

*40. A card recording device according to claim 39, wherein said thermal transfer printer unit is a thermal sublimation printer unit.*

*41. A card recording device according to claim 38, wherein said printer unit is a letter printer unit.*

*42. A card recording device according to claim 38, wherein said printer unit is an image printer unit.*

*43. A card recording device according to claim 38, wherein said first and second card transfer passages intersect at right angles.*

*44. A card recording device according to claim 38, wherein said card turning device rotates exactly at said intersection point.*

*45. A card recording device according to claim 38, further includes a platen roller disposed at a recording position defined on said second card transfer passage.*

*46. A card recording device according to claim 45, further includes a reciprocating driver movable with respect to said platen roller.*

*47. A card recording device according to claim 38, further includes a ribbon to be pressed against the card moved along said second card transfer passage.*

*48. A card recording device according to claim 47, wherein said ribbon is contained in a ribbon cartridge.*

*49. A card recording device according to claim 38, further includes a cleaner for cleaning the card, said cleaner being disposed on said first card transfer passage.*

*50. A card recording device comprising:*

*a first card transfer passage for transferring a card;*

*a second card transfer passage intersecting with said first card transfer passage at an intersection point;*

*a card recording means for thermal-transferring information on the card, said card recording means being disposed on said second card transfer passage; and*

*a card turning means for transferring or turning the card, said card turning means being rotatably disposed at said intersection point of said first and second card transfer passages and pivots at said intersection point.*

*51. A card recording device comprising:*

*a first card transfer passage;*

*a second card transfer passage intersecting with said first card transfer passage at an intersection point;*

*a printer unit having at least a roller for transferring information on the cards, said printer unit being disposed on said second card transfer passage; and*

*a card turning device having at least a roller for transferring or turning the card, said card turning device being rotatably disposed at said intersection point of said first and second card transfer passages and pivots at said intersection point.*

* * * * *